(12) United States Patent
Collmeyer et al.

(10) Patent No.: US 6,434,021 B1
(45) Date of Patent: Aug. 13, 2002

(54) SWITCHING POWER SUPPLY PACKAGES

(75) Inventors: Arthur J. Collmeyer, Incline Village, NV (US); Mark D. Telefus, Orinda; Dickson T. Wong, Burlingame, both of CA (US); David B. Manner, Traverse City, MI (US)

(73) Assignee: iWatt, Los Gatos, CA (US)

( * ) Notice: Subject to any disclaimer, the term of this patent is extended or adjusted under 35 U.S.C. 154(b) by 0 days.

(21) Appl. No.: 09/713,541

(22) Filed: Nov. 15, 2000

Related U.S. Application Data

(60) Provisional application No. 60/213,808, filed on Jun. 22, 2000, and provisional application No. 60/209,707, filed on Jun. 5, 2000.

(51) Int. Cl.[7] ............................................. H02M 3/335
(52) U.S. Cl. ..................................... 363/21.01; 363/97
(58) Field of Search ........................... 363/20, 21.01, 363/21.1, 95, 97, 98

(56) References Cited

U.S. PATENT DOCUMENTS

| 5,313,381 A | 5/1994 | Balakrishnan | 363/147 |
|---|---|---|---|
| 5,335,162 A * | 8/1994 | Martin-Lopez et al. | 363/97 |
| 5,424,933 A * | 6/1995 | Illingworth | 363/21 |
| 5,663,874 A * | 9/1997 | Mader et al. | 363/21 |
| 5,841,643 A | 11/1998 | Schenkel | 363/21 |

* cited by examiner

Primary Examiner—Adolf Deneke Berhane
(74) Attorney, Agent, or Firm—Lyon & Lyon LLP

(57) ABSTRACT

Various three, four and five terminal power supply control packages for controlling delivery of power from a source to a load in both single and dual switch transformer coupled power converters are disclosed. By way of example, a three-terminal control package has a first terminal for coupling to a primary winding of a transformer, a second terminal for coupling to a ground reference and a third terminal for coupling to a source of operating power. An internal power switch has an input coupled to the first terminal, an output coupled to the second terminal, and an activation gate. The package includes pulse train control circuitry coupled to the power switch activation gate and responsive to an error signal for driving the power switch, the error signal derived from an internally generated compensation signal corresponding to an expected voltage loss between the source and the load.

24 Claims, 16 Drawing Sheets

SWITCHING POWER SUPPLY PACKAGES

CROSS REFERENCE TO RELATED APPLICATIONS

This application is related and claims priority under 35 U.S.C. §119(e) to Provisional Application Ser. No. 60/213,808, filed Jun. 22, 2000, which is fully incorporated by reference herein. This application is further related and claims priority under 35 U.S.C. §119(e) to Provisional Application Ser. No. 60/209,707, filed Jun. 5, 2000, which is fully incorporated by reference herein.

FIELD OF THE INVENTION

This invention pertains generally to the field of power conversion and, more particularly, to switching power supplies with feedback control.

BACKGROUND

Compact and efficient power supplies are an increasing concern to users and manufacturers of electronics. Switching power supplies with pulse width modulated ("PWM") controllers offer both compactness and efficiency in a number of different topologies. Boost and buck switching power supply topologies are efficient, but do not isolate the power input from the power output. Other topologies, such as the flyback, do isolate the power input from the power output by using a transformer. In such topologies, feedback from the secondary (power output) side of the transformer is needed to adjust the pulse width modulation duty cycle of the power switch. PWM control for a switching power supply may be provided from a single integrated circuit chip or package having some number of external connection pins or terminals. As with many other types of integrated circuit chips or packages, limiting the number of external connection terminals of a power supply package can be advantageous.

For example, U.S. Pat. No. 5,313,381 to Balakrishnan (the "'381 patent"), which is fully incorporated by reference, discloses a three-terminal switching power supply control chip for use with a flyback converter. FIG. 1 illustrates a flyback converter 20 according to the '381 patent. The converter 20 employs a three-pin control chip 22 to supply current from a rectified DC source ($V_{bb}$) 28 across an isolating transformer 24 to supply power for a load 26. The power supply chip 22 includes a first terminal 30 coupled to a primary winding 32 of the transformer 24, a second ("ground") terminal 36 coupled to a primary side ground reference, and a third terminal 40 for accepting a combined feedback control signal ($I_{FB}$) and a bias supply voltage ($V_{cc}$) to operate the control chip 22.

Within the power supply chip 22, the first terminal 30 is alternately coupled to the ground terminal 36 by a power transistor switch 42. PWM control circuitry 44 drives the power switch 42 at a variable duty cycle. When the power switch 42 is ON, current flows through the primary winding 32 and energy is stored in the magnetic core 45 of the transformer 24. When the switch 42 is OFF, a secondary diode 46 is forward biased and the stored energy in the transformer core 45 is released through a secondary winding 48 to a filter/storage capacitor 47 and the load 26. After the transformer 24 is reset, the ON/OFF cycle is repeated.

An error amplifier 50 compares the output voltage $V_{out}$ across the load 26 with a reference voltage to generate the feedback control signal $I_{FB}$. The bias supply voltage $V_{cc}$ is supplied from an auxiliary secondary winding 52 of the transformer 24. The bias supply voltage $V_{cc}$ is modulated with the feedback control signal $I_{FB}$ in an opto-isolator 54 to create the combined bias voltage, feedback signal $V_{cc}/I_{FB}$. A feedback extraction circuit (not shown) in the chip 22 separates the feedback signal $I_{FB}$ from the bias voltage $V_{cc}$ by sensing the excess current flowing through a shunt regulator. The extracted feedback signal $I_{FB}$ is used to control the output of the PWM circuitry 44 to constantly adjust the duty cycle of the power switch 42 so as to transfer greater or lesser current to the secondary.

Notably, to properly compensate the PWM controller based on feedback from the secondary requires extra components and often involves expensive re-design, depending upon the particular application. Yet, prior art isolated power supplies that used feedback only from the primary side of the transformer do not account for power losses encountered on the secondary side of the transformer. See, e.g., U.S. Pat. No. 5,982,644, (the '644 patent), which discloses a pulse-width-modulated boost converter coupled to a high voltage converter, which in turn is coupled to the primary side of a transformer. The modulation of the boost converter is adjusted according to an amplified error signal representing the difference between the boost converter's output voltage and the voltage from a current sensing circuit sensing the current through the primary winding. This error signal has no way of sensing and accounting for the losses on the secondary side of the transformer. Thus, the power supply disclosed in the '644 patent employs a linear regulator on the secondary side of the transformer to maintain a constant voltage over the load. Although this power supply avoids the use of feedback from the secondary side of the transformer, it introduces the expense and loss associated with installing an additional regulator at the load.

Thus, it would be desirable to provide minimal terminal power supply packages for controlling more complex power converter topologies, including packages that isolate the input and output through a transformer without requiring feedback from the secondary side of the transformer, thereby easing design and reducing the component count.

SUMMARY OF THE INVENTION

In accordance with a first aspect of the invention, a three-terminal power supply package is provided for controlling delivery of power from a source to a load. In a preferred embodiment, the three-terminal package has a first terminal for coupling to a primary winding of a transformer, a second terminal for coupling to a ground reference, a third terminal for coupling to a source of operating power, and an internal power switch. The internal power switch has an input coupled to the first terminal, an output coupled to the second terminal, and an activation gate. The control package further includes pulse train control circuitry coupled to the power switch activation gate and responsive to an error signal for driving the power switch. The error signal is derived from an internally generated compensation signal corresponding to an expected voltage loss between the source and the load. The control package may be used to control a number of single switch, transformer coupled power converter topologies, including (by way of example only) flyback and combined forward-flyback converters. Depending on design considerations, the internal power switch and pulse train control circuitry may be formed as part of a single integrated circuit.

In accordance with another aspect of the invention, a four-terminal power supply package is provided for controlling delivery of power from a source to a load. In a preferred embodiment, the control package has a first terminal for coupling to a primary winding of a transformer, a second terminal for coupling to a ground reference, a third terminal for coupling to a source of operating power, and a fourth terminal for coupling to an external compensation circuit for generating a compensation signal corresponding to an expected voltage loss between the source and the load. The package includes an internal power switch having an input coupled to the first terminal, an output coupled to the second terminal, and an activation gate. The control package further includes pulse train control circuitry coupled to the internal power switch activation gate and responsive an error signal for driving the power switch, the error signal derived from the compensation signal received on the fourth terminal. The control package may be used to control a number of single switch, transformer coupled power converter topologies, including (by way of example only) flyback and combined forward-flyback converters. Depending on design considerations, the internal power switch and pulse train control circuitry may be formed as part of a single integrated circuit.

In accordance with yet another aspect of the invention, a four-terminal power supply package is provided for controlling delivery of power from a source to a load. In a preferred embodiment, the control package has a first terminal for coupling to a primary winding of a transformer, a second terminal for coupling to an activation gate of an external power switch, a third terminal for coupling to a ground reference, and a fourth terminal for coupling to a source of operating power. The package includes an internal power switch having an input coupled to the first terminal, an output coupled to the third terminal, and an activation gate. The control package further includes pulse train control circuitry coupled to both the internal power switch activation gate and the second terminal (for driving the externally power switch). The pulse train control circuitry is responsive to an error signal for driving the respective power internal and external power switches. The error signal is derived from an internally generated compensation signal corresponding to an expected voltage loss between the source and the load. The control package may be used to control a number of dual switch, transformer coupled power converter topologies, including (by way of example only) push-pull, half bridge and interleaved flyback. Depending on design considerations, the internal power switch and pulse train control circuitry may be formed as part of a single integrated circuit.

In accordance with a further aspect of the invention, a five-terminal power supply package is provided for controlling delivery of power from a source to a load. In a preferred embodiment, the control package has a first terminal for coupling to a primary winding of a transformer, a second terminal for coupling to an activation gate of an external power switch, and third terminal for coupling to a ground reference, a fourth terminal for coupling to a source of operating power, and a fifth terminal for coupling to an external compensation circuit for generating a compensation signal corresponding to an expected voltage loss between the source and the load. The package includes an internal power switch having an input coupled to the first terminal, an output coupled to the third terminal, and an activation gate. The control package further includes pulse train control circuitry coupled to both the internal power switch activation gate and the second terminal (for driving the externally power switch). The pulse train control circuitry is responsive to an error signal for driving the respective power internal and external power switches, the error signal derived from the compensation signal received on the fifth terminal. The control package may be used to control a number of dual switch, transformer coupled power converter topologies, including (by way of example only) push-pull, half bridge and interleaved flyback. Depending on design considerations, the internal power switch and pulse train control circuitry may be formed as part of a single integrated circuit.

In accordance with a still further aspect of the invention, a four-terminal power supply package is provided for controlling delivery of power from a source to a load. In a preferred embodiment, the control package has a first terminal for coupling to a first primary winding of a transformer, a second terminal for coupling to a second primary winding of the transformer, a third terminal for coupling to a ground reference, and a fourth terminal for coupling to a source of operating power. The control package includes both first and second internal power switches, the first power switch having an input coupled to the first terminal, an output coupled to the third terminal, and an activation gate, and the second power switch having an input coupled to the second terminal, an output coupled to the third terminal, and an activation gate. Pulse train control circuitry is coupled to the first and second power switch activation gates, the pulse train control circuitry responsive to an error signal for driving the respective first and second power switches. The error is derived from an internally generated compensation signal corresponding to an expected voltage loss between the source and the load. In one preferred implementation, the control package is employed to control a push-pull power converter. Depending on design considerations, the first power switch, second power switch, pulse train control circuitry, or some combination thereof, may be provided in a single integrated circuit.

In accordance with still another aspect of the invention, a five-terminal power supply package is provided for controlling delivery of power from a source to a load. In a preferred embodiment, the control package has a first terminal for coupling to a first primary winding of a transformer, a second terminal for coupling to a second primary winding of the transformer, a third terminal for coupling to a ground reference, a fourth terminal for coupling to a source of operating power, and a fifth terminal for coupling to an external compensation circuit for generating a compensation signal corresponding to an expected voltage loss between the source and the load. The control package includes both first and second internal power switches, the first power switch having an input coupled to the first terminal, an output coupled to the third terminal, and an activation gate, and the second power switch having an input coupled to the second terminal, an output coupled to the third terminal, and an activation gate. Pulse train control circuitry is coupled to the first and second power switch activation gates, the pulse train control circuitry responsive to an error signal for driving the respective first and second power switches. The error signal is derived from the compensation signal received on the fifth terminal. In one preferred implementation, the control package is employed to control a push-pull power converter. Depending on design considerations, the first power switch, second power switch, pulse train control circuitry, or some combination thereof, may be provided in a single integrated circuit.

Other objects and features of the present inventions will become apparent hereinafter.

BRIEF DESCRIPTION OF THE DRAWINGS

The drawings illustrate both the design and utility of the preferred embodiments of the present invention, in which similar elements in different embodiments are referred to by the same reference numbers for ease in illustration, wherein.

DETAILED DESCRIPTION OF THE EMBODIMENTS

For purposes of the following description and claims, the term "package" is to be broadly construed to include, by way of example and not limitation, a single chip or semiconductor die having one or more circuits formed thereon, as well as a plurality of chips and/or semiconductor dies having one or more circuits each formed thereon and mounted on common substrate. The term "terminal" is also to be broadly construed to include any form of electrical junction that serves a either an input or output to a circuit in the package.

By way of example only, a package may comprise a substrate having one or more dies mounted thereon and covered with a protective lid, with a number of terminals (e.g., metal leads) extending from the package and coupled to circuit elements located on the one or more dies. As used herein when describing elements of the preferred embodiments, "external power switch" refers to a switch located outside of a power supply control package, and "internal power switch" refers to a switch located within a power supply control package.

Figure 1:
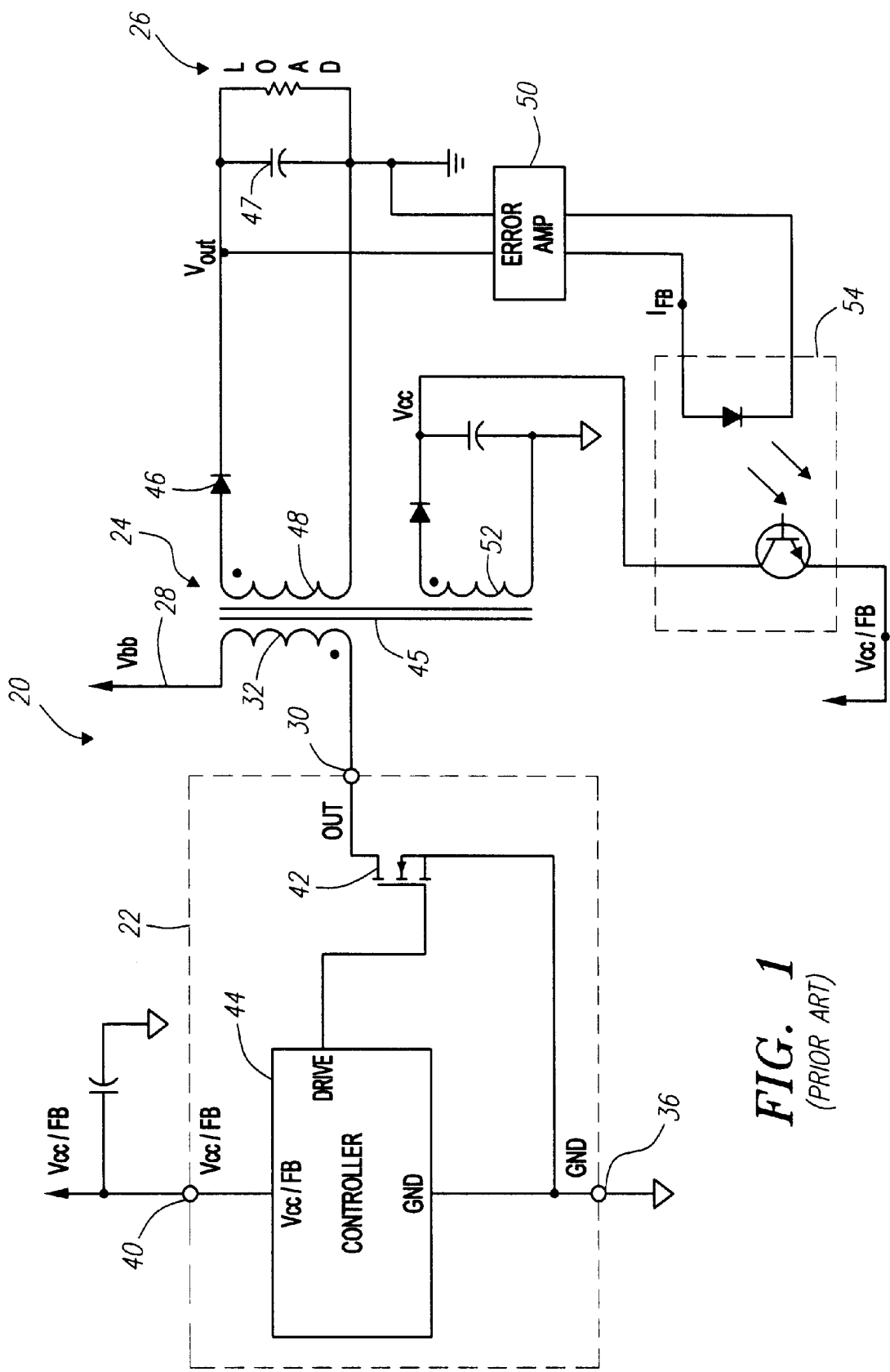
FIG. 1 is a schematic diagram of a flyback converter employing a prior art three-terminal switching power supply chip.
Figure 2:
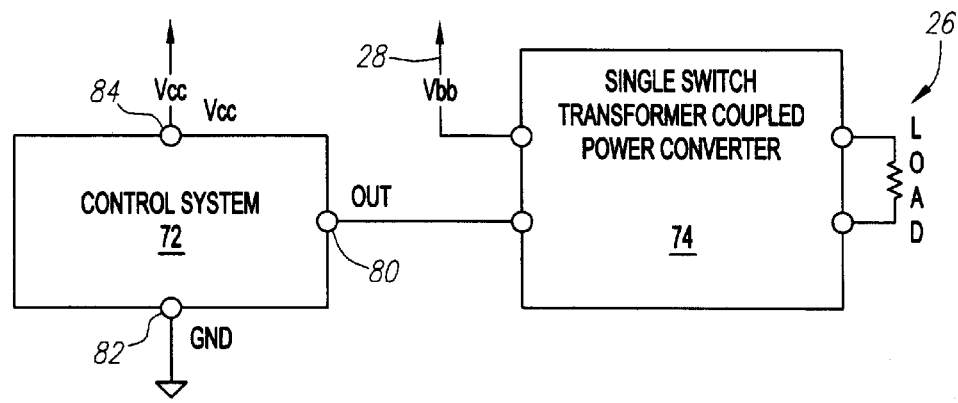
FIG. 2 is a simplified block diagram of a preferred three-terminal power supply controller employed with a single switch transformer coupled power converter.

FIG. 2 is a simplified depiction of a preferred three-terminal power supply control package 72 for controlling a single switch transformer coupled power converter 74. A first ("output") terminal 80 is provided for coupling a drain terminal of an internal power switch (not shown) within the control package 72 to an isolating transformer, which is coupled to a rectified DC source ($V_{bb}$) 28, for transferring pulses of power across the transformer to supply power to a load 26. A second ("ground") terminal 82 is provided for coupling a source terminal of the internal power switch to a primary side ground reference. A third ("bias power") terminal 84 is provided for receiving a bias supply voltage ($V_{cc}$) to operate the control package 72. Also internal to the control package is a preset (internal) compensation circuit (not shown) to account for the non-load related losses across the secondary side of the power converter 74 as part of the control circuitry (not shown) for the internal power switch. Further details of control package 72 and its operation are provided below in conjunction with the description of FIG. 6.

Figure 3:
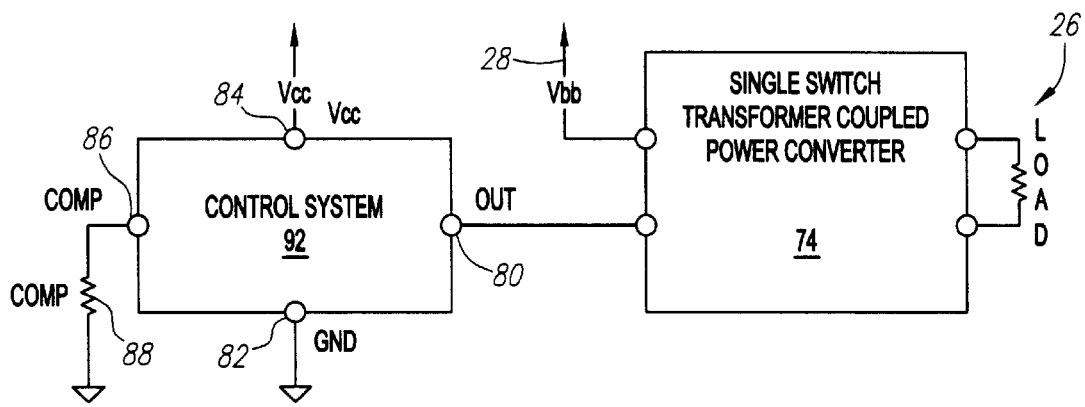
FIG. 3 is a simplified block diagram of a preferred four-terminal power supply controller employed with a single switch transformer coupled power converter.

FIG. 3 is a simplified depiction of a preferred four-terminal power supply control package 92 for controlling power converter 74. The control package 92 includes the same terminals 80, 82 and 84, and internal power switch (not shown), as does control package 72. In lieu of the internal compensation circuit in control package 72, a fourth ("compensation") terminal 86 is also provided in package 92 for coupling internal control circuitry (not shown) to an external compensation circuit (i.e., resistance 88) to account for the non-load related losses across the secondary side of the power converter 74. In this manner, designers of the power converter 74 are afforded alternative approaches in the control package, with the three-terminal, internal compensation package 72 reducing the total number of terminals, and the four-terminal, external compensation package 92 allowing for ease in tuning the compensation circuit 88. Further details of control package 92 and its operation are provided below in conjunction with the description of FIG. 6A.

Figure 4:
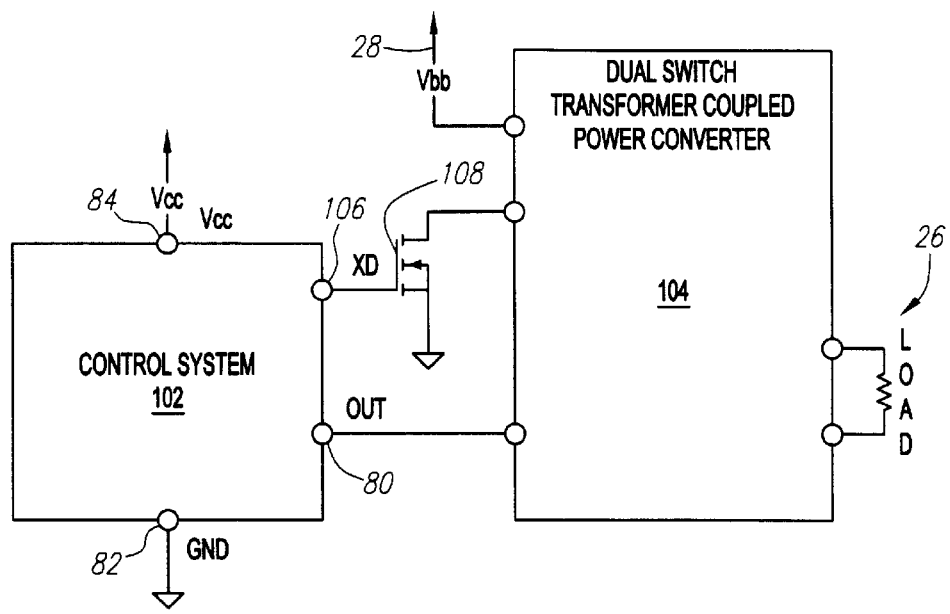
FIG. 4 is a simplified block diagram of a preferred four-terminal power supply controller employed with a dual switch transformer coupled power converter.

FIG. 4 is a simplified depiction of a preferred four-terminal, internal compensation control package 102 for controlling a dual switch transformer coupled power converter 104. The control package 102 includes the same terminals 80, 82 and 84, internal power switch (not shown) and internal compensation circuit (not shown), as control package 72. A fourth ("external switch drive") terminal 106 is also provided for coupling internal control circuitry (not shown) to an external power switch 108 used in conjunction with the internal power switch for transferring pulses of power across an isolating transformer (not shown) to supply power to the load 26. Further details of control package 102 and its operation are provided below in conjunction with the description of FIG. 9.

Figure 5:
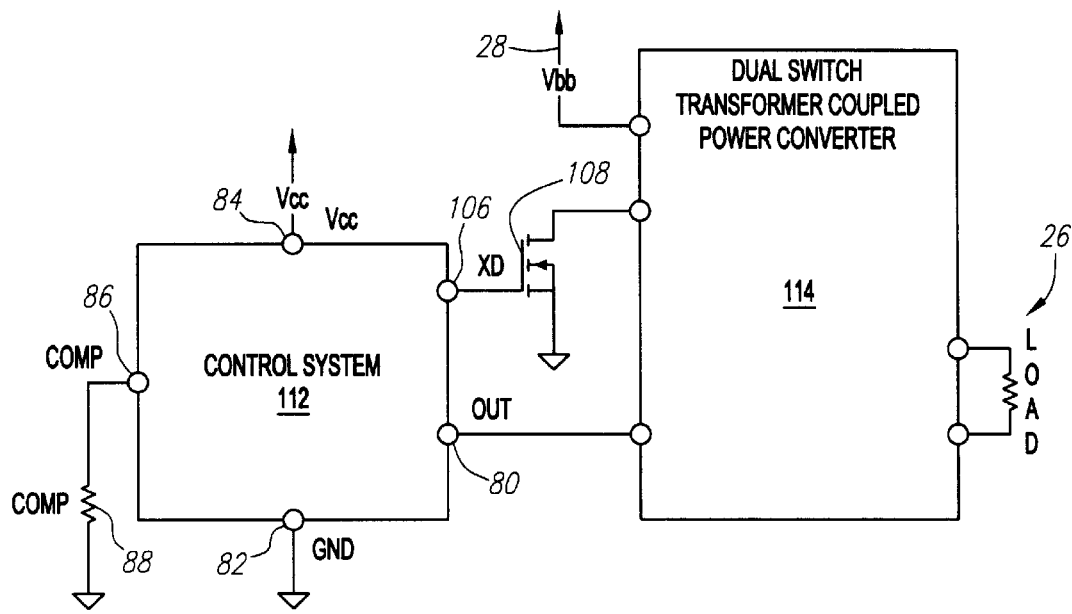
FIG. 5 is a simplified block diagram of a preferred five-terminal power supply controller employed with a dual switch transformer coupled power converter.

FIG. 5 is a simplified depiction of a preferred five-terminal (external compensation) control package 112 for controlling power converter 104. The control package 102 includes the same terminals 80, 82, 84 and 86, internal power switch (not shown) and as control package 92, plus the same fifth (external switch drive) terminal 106 as control package 102. Further details of control package 112 and its operation are provided below in conjunction with the description of FIG. 9A.

Figure 6:
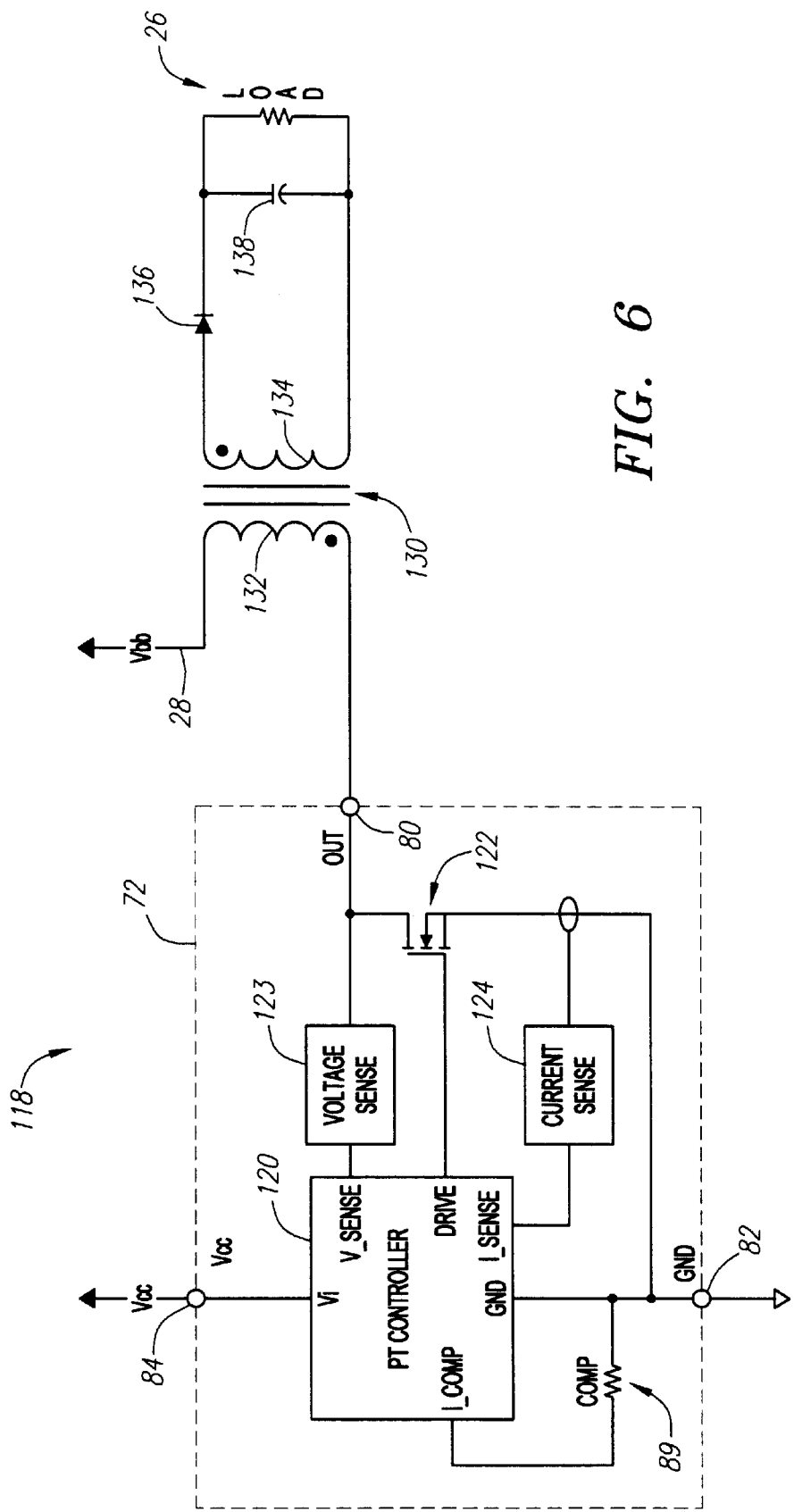
FIG. 6 is a schematic diagram of a flyback converter employing the three-terminal controller of FIG. 2.

FIG. 6 illustrates a flyback converter 118 employing the three-terminal control package 72 of FIG. 2 to supply current from a rectified DC source ($V_{bb}$) 28 across an isolating transformer 130 to supply power to a load 26. The transformer 130 includes a primary winding 132 coupled at one end to $V_{bb}$ 28 and at the other end to the output terminal 80 of control package 72. Within control package 72, the output terminal 80 is alternately coupled to the ground terminal 86 by an internal power switch 122. Thus, when the power switch 122 is ON, current flows through the primary winding 132 and energy is stored in the magnetic core of the transformer 130. When the power switch 122 is OFF, the current flow through the primary side winding 132 is interrupted and the stored energy in the core of transformer 130 is released through a flyback-biased secondary winding 134 and diode 136 to a filter/storage capacitor 138 and the load 26.

The power switch 122 is driven by pulse train control circuitry ("pulse train controller") 120 at a constant ON time and switching frequency. The pulse train controller 120 regulates the number of pulses of power appearing over time at the load 26 by controlling a rate of constant frequency, constant ON time switching pulses output from an internal pulse generator that activate the power switch 122. The continuous switching pulse train is preferably output at a relatively high frequency, e.g., 1 MHz. For example, the pulse train controller 120 may control the number of pulses that occur at the power switch 122 by using a gating function, or by using a controllable synthesizer to generate the switching pulses on demand, as needed. In particular, the pulse train controller 120 controls the rate of pulses sent to the power switch 122 based current output load conditions. Unlike a PWM control technique, the switch ON time and frequency are uncoupled from the output conditions of the load 26, and instead are selectively applied to the gate of the power switch 122 to maintain a desired output power level.

Figure 7:
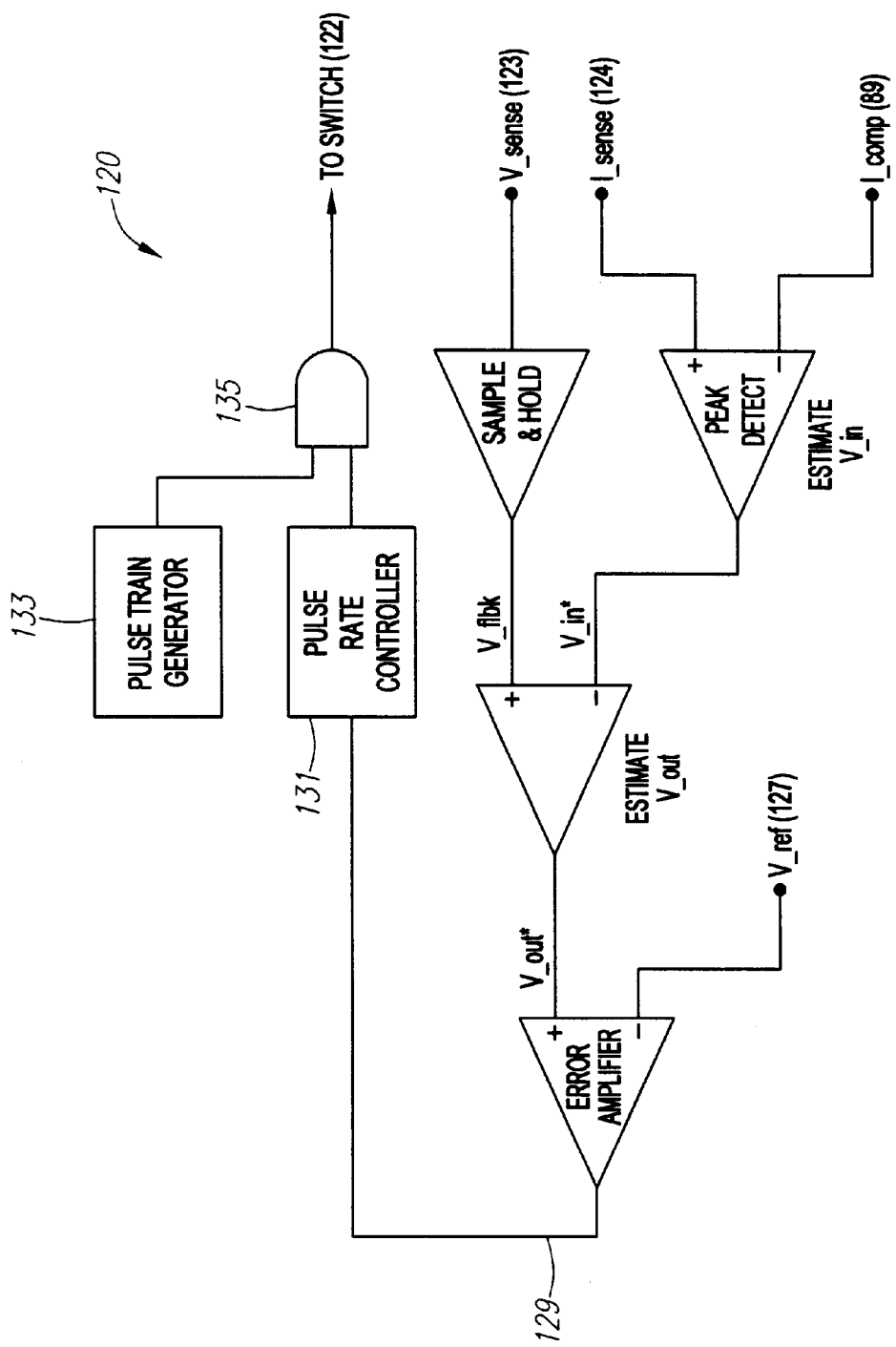
FIG. 7 is a schematic diagram of a preferred controller employed in the power supply controllers of FIGS. 2–5 for driving one or more power switches.

With additional reference to FIG. 7, regulation of the switching pulses by the pulse train controller 120 is accomplished, as follows:

While the switch 122 is ON, current through the primary winding 132 (and, accordingly, through switch 122) will ramp up, reaching a peak at the moment just before the switch 122 is turned OFF. The primary current is sensed (and peak detected) with a current sensing circuit 124, e.g., employing a small current sensing resistor (not shown). This signal, I_sense, (encoded as a voltage) is an input to the pulse train controller 120. Also input into the pulse train controller 120 is an internally generated compensation signal I_comp, which corresponds to an expected power loss during each switching cycle. Notably, because the ON-time duration for each switching cycle is constant, the losses through the transformer windings, secondary diodes, etc., are also constant, and are represented by the compensation signal I_comp set by a selected resistance 89. Within the pulse train controller 120, the two signals I_sense and I_comp are compared to derive an estimated value (designated as V_in*) of the input voltage $V_{bb}$ 28.

When the switch 122 is OFF, the voltage at the drain terminal is sensed and sampled by a voltage sense circuit 123. In particular, the drain voltage is sensed after the switching transient, but before the transformer is reset, so as to a "flyback" voltage (designated as V_flbk) following each switching cycle. V_flbk is momentarily held in the voltage sensing circuit 123 and then input into the pulse train controller 120, along with the peak primary current signal I_sense during the next ON switching cycle. Within the pulse train controller 120, V_flbk is compared to the estimated input voltage V_in* (derived from the peak primary current signal I_sense) to derive an estimated output voltage V_out*, according to the relationship (V_flbk−V_in)*$N_S/N_P$=V_out*, where $N_S/N_P$ is the turns ratio of the transformer windings 1334/132. The estimated output voltage V_out* is then scaled (not shown) and compared to an internal reference voltage V_ref 127, where V_ref is set at a scaled desired output voltage level to be maintained, irrespective of load conditions. The difference between the scaled estimated output voltage V_out* and the reference voltage V_ref forms a feedback error signal 129. The error signal 129 is input into a pulse rate controller 131. The pulse rate controller 131 controls a gate 135 for regulating the rate of switching pulses generated by a pulse generator 133 that are output from the controller 120 to activate the gate of the power switch 122.

For example, in one embodiment, the error signal 129 is a scaled voltage from zero to one volt, where "zero" means no switching pulses from the pulse generator 133 are released by the gate 135, and "one" means 100% of the switching pulses are released by the gate 135. If the scaled estimated output voltage V_out* is less than the reference voltage V_ref, the error signal 129 will increase, causing a corresponding increase in the rate of output switching pulses the gate 135 and, thus, output voltage of the converter 118. If the scaled estimated output voltage V_out* is greater than the reference voltage V_ref, the error signal 129 will decrease, causing a corresponding decrease in the rate of switching pulses released by the gate 135 and, thus, the output voltage of the converter 118.

In alternate embodiments, the pulse rate controller 131 may also regulate the rate of delivered switching pulses based on fluctuations in the input voltage $V_{bb}$ 28. For example, under high input voltage and low output load conditions, the rate of switching pulses over time would be relatively low. As the input voltage decreases or the output load increases, the rate of switching pulses is then increased. Also, it alternate embodiments, the reference voltage V_ref 127 may be scaled, rather than scale the estimated output voltage V_out*, in order to accomplish appropriate comparison level for generating the feedback error signal 129.

A more detailed description of a preferred primary side feedback system used in conjunction with a pulse train control system is provided in commonly assigned U.S. patent application Ser. No. [not-yet-assigned; Lyon & Lyon attorney docket 255/088, entitled, "Transformer-Coupled Switching Power Converter Having Primary Feedback Control"], filed on the same date herewith, which is fully incorporated herein by reference. A more detailed description of the principle and operation of various pulse train controller embodiments is provided in commonly assigned U.S. patent application Ser. No. 09/585,928, filed Jun. 2, 2000, which is fully incorporated herein by reference.

Figure 6A:
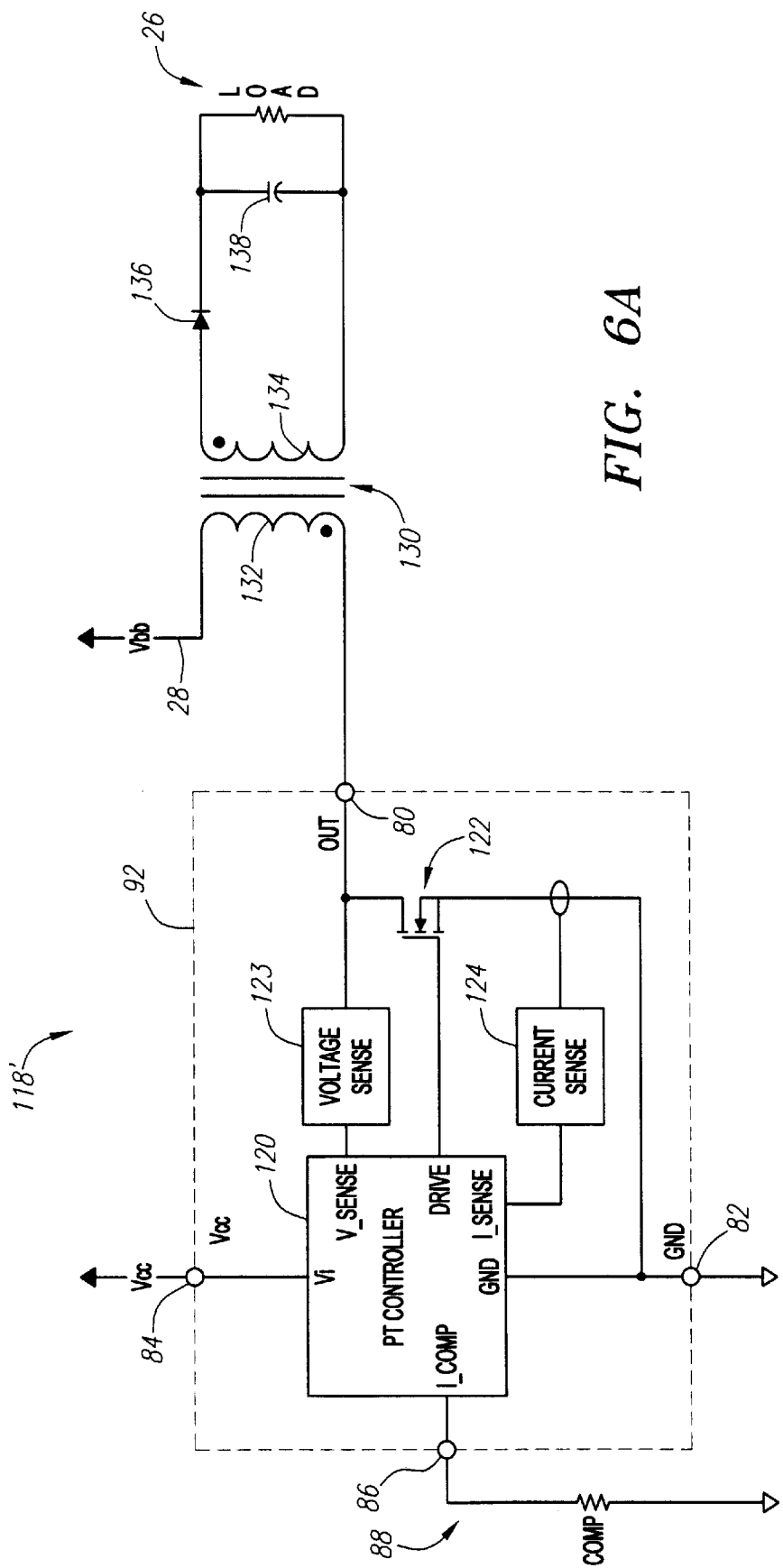
FIG. 6A is a schematic diagram of a flyback converter employing the four-terminal controller of FIG. 3.

FIG. 6A shows an alternate embodiment of the converter topology of FIG. 6, (designated as "118'"), wherein control package 92 is used instead of package 72. In package 92, there is no internal compensation circuit (i.e., resistance) 89. Instead, the forth terminal 86 is configured to coupled to an external compensation circuit 88, which is also implemented in the illustrated embodiment as a resistance. Depending on design considerations, it may be advantageous to minimize terminals, wherein the three-terminal control package 72 may be preferable. In other instances, it may be desirable to be able to tune the resistance of the compensation signal 88 after the control package (i.e., package 92) is installed in the converter 118', e.g., to account for the individual transformer and/or diode characteristics. As will be appreciated, the flyback converter topologies 118 and 118' can also be implemented as resonant flyback converters by the addition of a resonant tank (i.e., capacitor) in series with the primary side winding 132.

Figure 8:
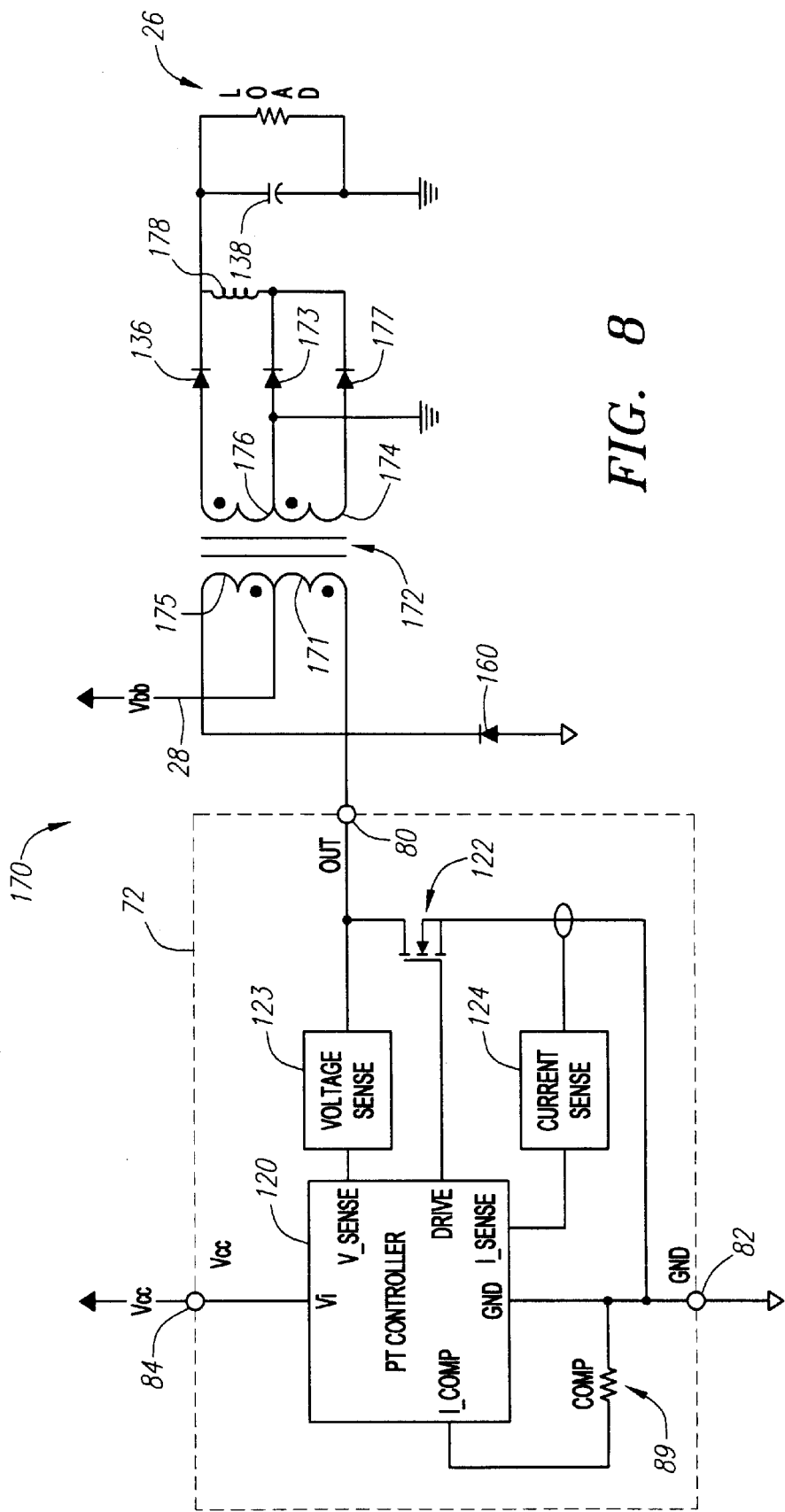
FIG. 8 is a schematic diagram of a single switch transformer coupled converter having both forward and flyback biased secondary windings and employing the three-terminal controller of FIG. 2.

FIG. 8 depicts a further single switch converter topology 170 employing the three-terminal control package 72 to supply current from the DC source $V_{bb}$ 28 across an isolating transformer 172 to supply power to the load 26. The first terminal of the control package 72 is coupled to a first end of a first primary winding 171 of transformer 172, with the second end of the first primary winding 171 coupled to the source $V_{bb}$ 28. The source $V_{bb}$ 28 is also coupled to a first end of a second ("reset") primary winding 175 of transformer 172. A second end of the reset winding 172 is coupled to the primary side ground reference via a voltage clamping diode 160. The internal configuration and operation of control package 72 when employed in converter 170, including the internal configuration operation of the pulse train controller 120, is the same as described above in conjunction with FIGS. 6–7.

Operation of the converter 170 is as follows:

When the power switch 122 is ON, current flows through the first primary winding 171 and is transferred through a forward-biased secondary winding 176 and diode 136 to a filter/storage capacitor 138 and the load 26. Energy is also stored in the magnetic core of the transformer 172. When the switch 122 is OFF, energy stored in the transformer core is transferred as current through a flyback-biased secondary winding 174 and diode 177, via a filter inductor 178, to the filter/storage capacitor 138 and load 26. Current also flows in the "reverse" direction through the clamping diode 160 and reset winding 175, some of which is also transferred to the flyback-biased secondary winding 174. A further secondary diode 173 is provided to transfer any remaining current from the flyback-biased secondary winding 174 "pulled" by the current flow through the filter inductor 178 to the load 26, once the voltage across diode 177 drops to its reverse bias point. Notably, the peak voltage at the drain terminal of switch 122 is effectively clamped by diode 160 to protect the switch 122, but this limit does not impact the flyback voltage V_flbk sensed by the voltage sensing circuit 123. After the transformer 172 is reset, the ON/OFF cycle of switch 122 is repeated by the next switching pulse delivered from the pulse train controller 120.

Figure 8A:
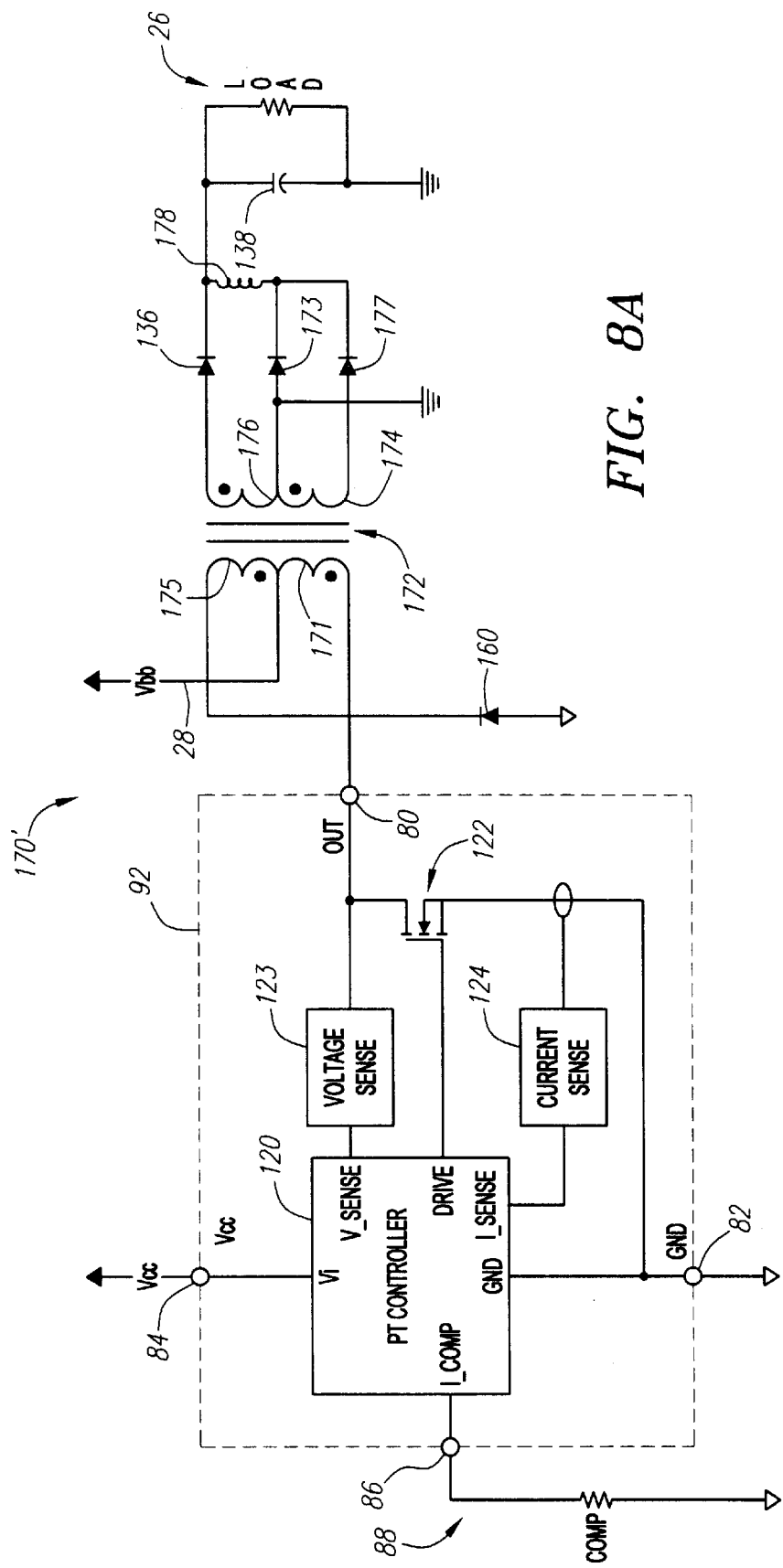
FIG. 8A is a schematic diagram of a transformer-coupled converter having both forward and flyback biased secondary windings and employing the four-terminal controller of FIG. 3.

FIG. 8A shows an alternate embodiment of the converter topology of FIG. 8, (designated as "170'"), wherein the four-terminal control package 92 is used instead of the three-terminal package 72.

Figure 9:
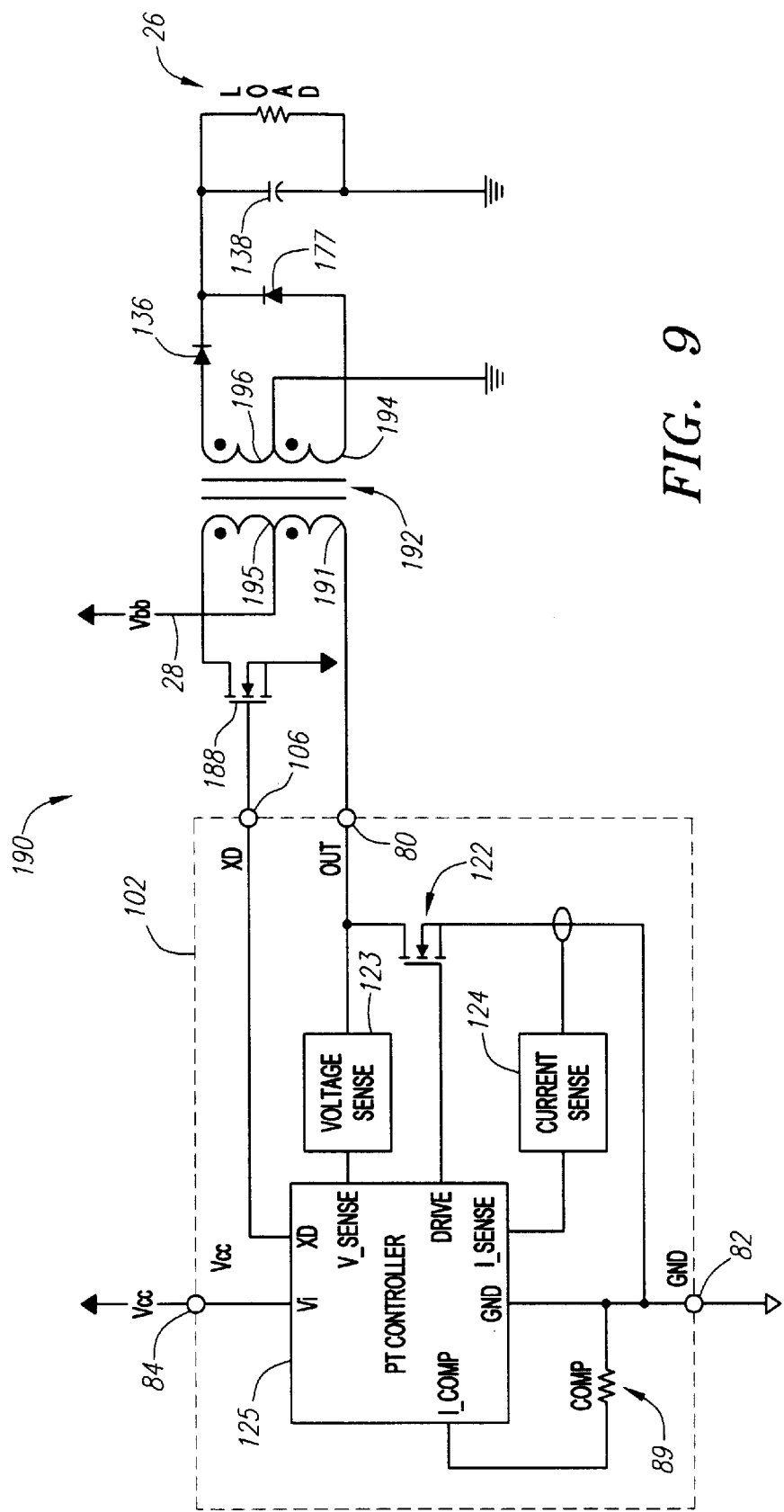
FIG. 9 is a schematic diagram of a push-pull converter employing the four-terminal controller of FIG. 4.

FIG. 9 depicts a push-pull converter 190 employing the four-terminal (internal compensation) control package 102 of FIG. 4 to supply current from the DC source $V_{bb}$ across transformer 192 to supply power to load 26. In this embodiment, a first end of a first primary winding 191 is coupled to the output terminal 80 of control package 102, with a second end of the first primary winding coupled to the source $V_{bb}$ 28. Within the control package 102, the output terminal 80 is alternately coupled to the ground terminal 82 by an internal power switch 122. The activation gate of switch 122 is driven by a pulse train controller 125, which operates similarly to pulse train controller 120 of control package 72.

The source $V_{bb}$ 28 is also coupled to a first end of a second primary winding 195, with a second end of winding 195 coupled to the drain terminal of an external power switch 188. The source terminal of external switch 188 is coupled to the primary side ground reference. The external switch 188 has an activation gate coupled to an external drive terminal 106 of the control package 102. Within the control package 102, the external drive terminal 106 is coupled to the pulse train controller 125. In this manner, the pulse train controller 125 drives both the internal power switch 122 and external switch 188. In particular, the pulse train controller 125 delivers equal (in quantity and duration) switching pulses to both the internal power switch 122 and, via external drive terminal 106, to the actuating gate of external power switch 188 although offset in timing, such that when the internal switch 122 is ON, the external switch 188 is OFF, and vice versa.

Operation of the converter 190 is as follows: When the external power switch 188 is ON, current flows through primary winding 195 and is transferred through a secondary winding 194 and forward biased diode 177 to the filter/storage capacitor 138 and load 26. When the internal switch 122 is ON, current flows through primary winding 191 and is transferred through a secondary winding 196 and forward biased diode 136 to the filter/storage capacitor 138 and load 26. The transformer 192 is self-resetting (i.e., due to the 180° differing current flows from the pull-push operation of switches 122 and 18). After the transformer 192 is reset, the ON/OFF cycle of switches 122 and 188 may be repeated.

With the push-pull converter 190 of FIG. 9, the feedback error signal to the pulse train controller 125 is derived differently than for controller 120 in the flyback converters of FIGS. 6 and 8. When the switch 122 is ON, the current sensing circuit 124 senses the peak current I_sense and compares it to the compensation signal I_comp set by resistance 89 and representing the losses across the transformer 192 and secondary diode elements for each ON cycle of switch 122. In addition, instead of sensing a flyback voltage, the voltage sense 123 senses a peak voltage $V_{PEAK}$ at the drain terminal of switch 122 after the switch 188 is turned ON. From the sensed peak voltage $V_{PEAK}$, an estimate of the voltage on the secondary winding $V_S$ is then derived from the relationship $V_S=[(V_P/2-1)*N_S/N_{PEAK}-0.5]*(2T_{ON}/T)$, where $N_S/N_P$ is the turns ratio for transformer windings 194/191, $T_{ON}$ is the ON time of switch 122, and T is a total switching cycle period for switches 122 and switch 188.

Figure 9A:
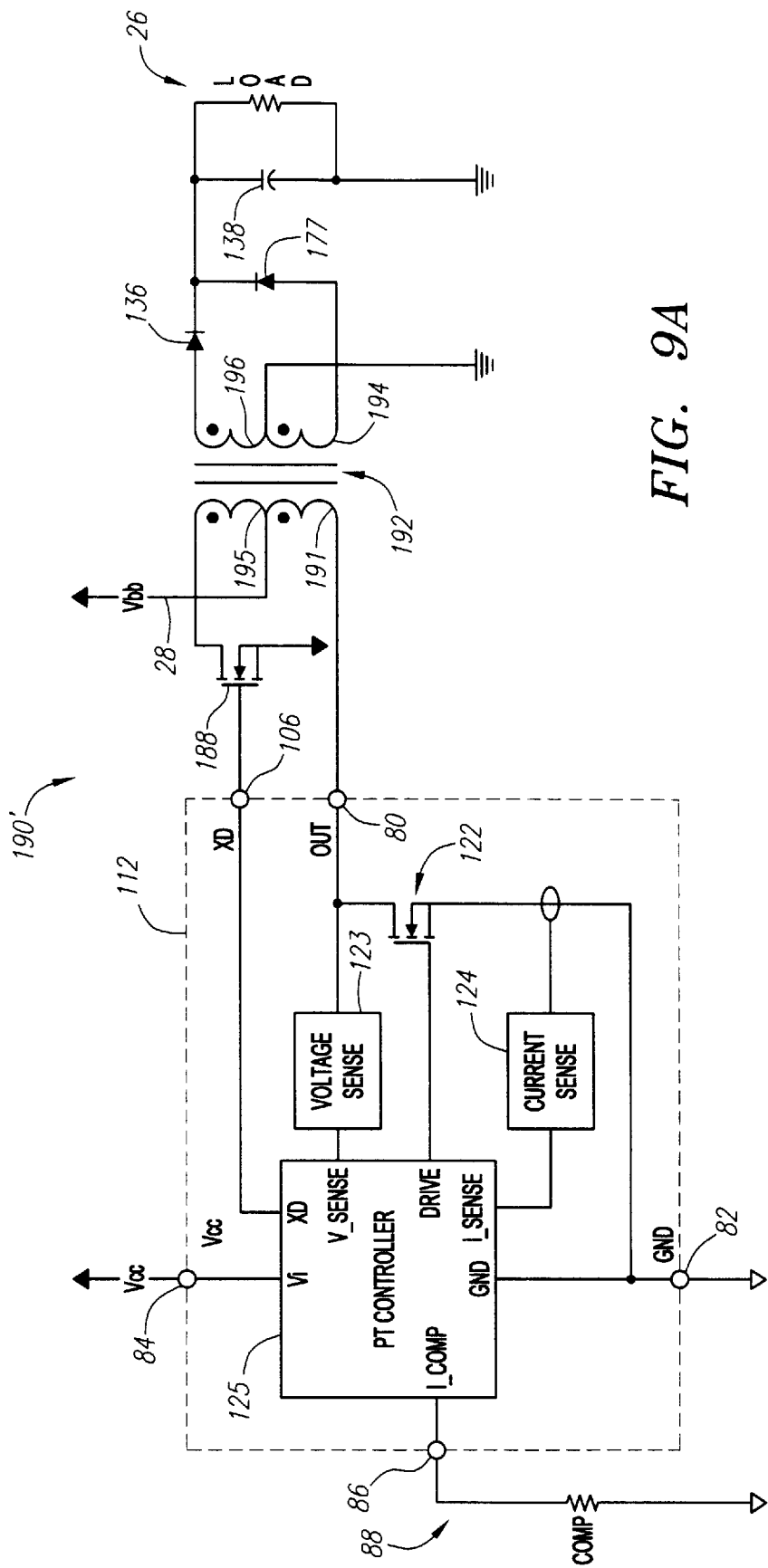
FIG. 9A is a schematic diagram of a push-pull converter employing the five-terminal controller of FIG. 5.

FIG. 9A shows an alternate embodiment of the converter topology of FIG. 8, (designated as "190'"), wherein the five-terminal (external compensation) control package 112 is used instead of the four-terminal (internal compensation) control package 102.

Figure 9B:
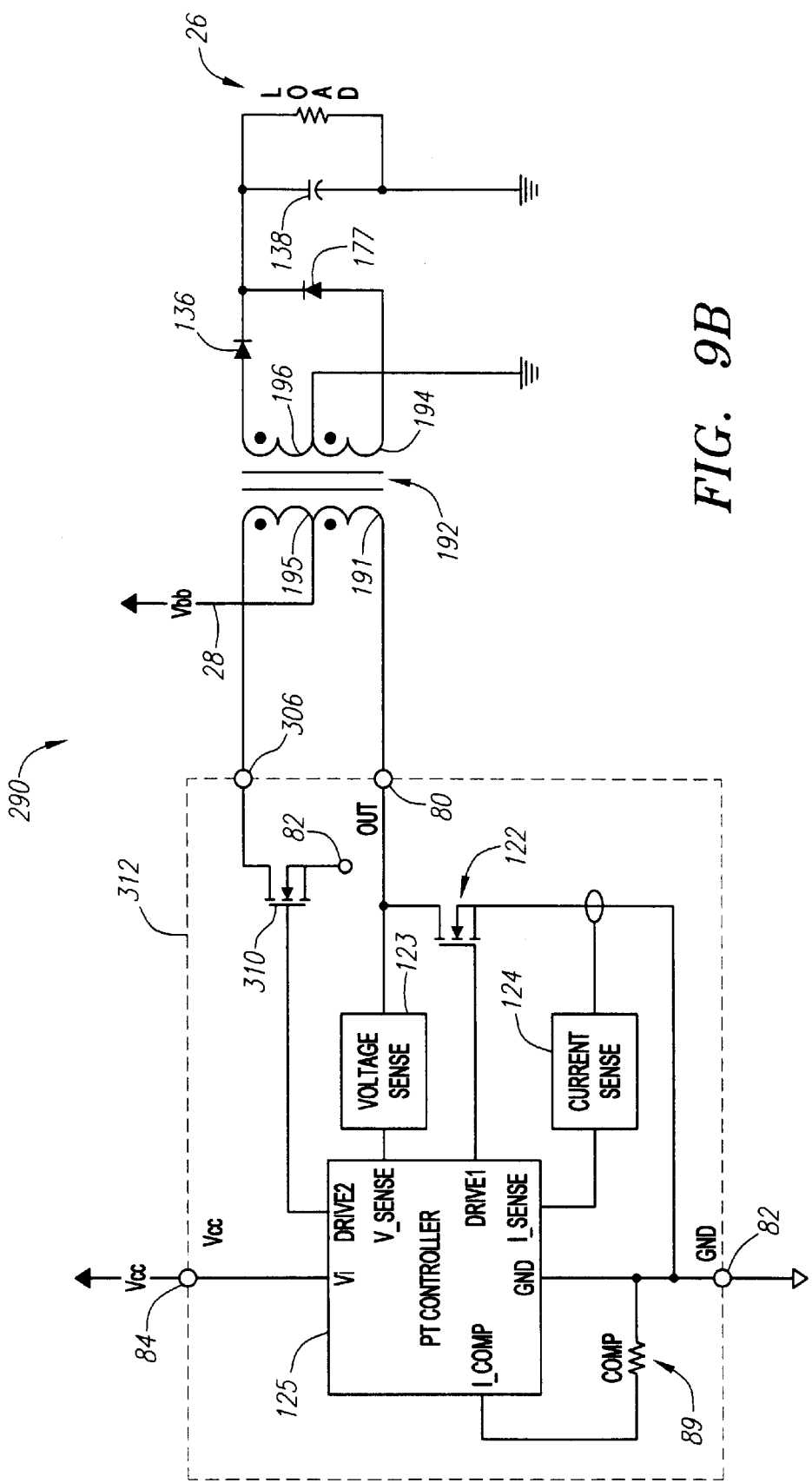
FIG. 9B is a schematic diagram of a push-pull converter employing a further preferred four-terminal power supply controller.

Referring to FIG. 9B, in accordance with a still another aspect of the invention, a variation 290 of push-pull converter 190 employs an alternate four-terminal (internal compensation) power supply package 312 to supply current from the DC source $V_{bb}$ 28 across transformer 192 to supply power to load 26. The converter 290 is identical in operation to converter 190 of FIG. 9, except that both power switches (122, 310) are located within the power supply package 312. In particular, package 312 includes a first terminal 80 coupled to a first end of first primary winding 191, a second terminal 86 coupled to a primary side ground reference, and a third terminal 84 coupled to a source of bias supply voltage ($V_{cc}$). A fourth terminal 306 is coupled a first end of the second primary winding 195. Source $V_{bb}$ 28 is coupled to the second ends of both of the first and second primary windings 191 and 195. The first terminal 80 of the power supply package 312 is alternately coupled to the ground terminal 86 by the first internal power switch 122, and the fourth terminal 306 is alternately coupled to the ground terminal 86 by the second internal power switch 310. Otherwise, operation of the converter 290 by control package 312, in which the pulse train controller 125 drives the respective first and second internal power switches 122 and 188 in response to inputs from the sensed primary voltage V_sense, primary current I_sense and compensation signal I_comp, is the same as with control package 102.

Figure 9C:
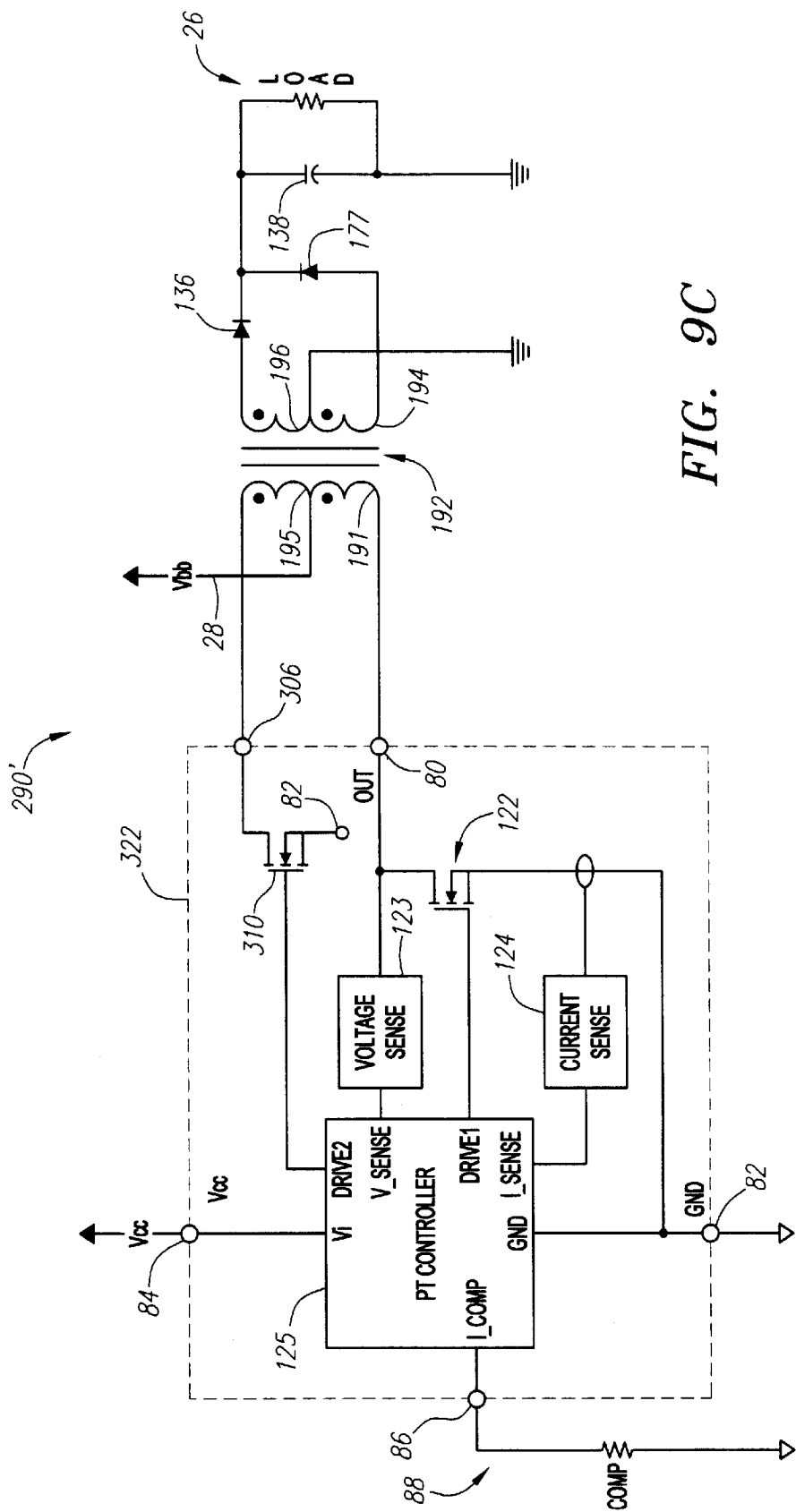
FIG. 9C is a schematic diagram of a push-pull converter employing a further preferred five-terminal power supply controller.

FIG. 9C shows an alternate embodiment of the converter topology of FIG. 9B, (designated as "290'"), wherein a five-terminal (external compensation) control package 322 is used instead of the four-terminal (internal compensation) control package 312.

Figure 10:
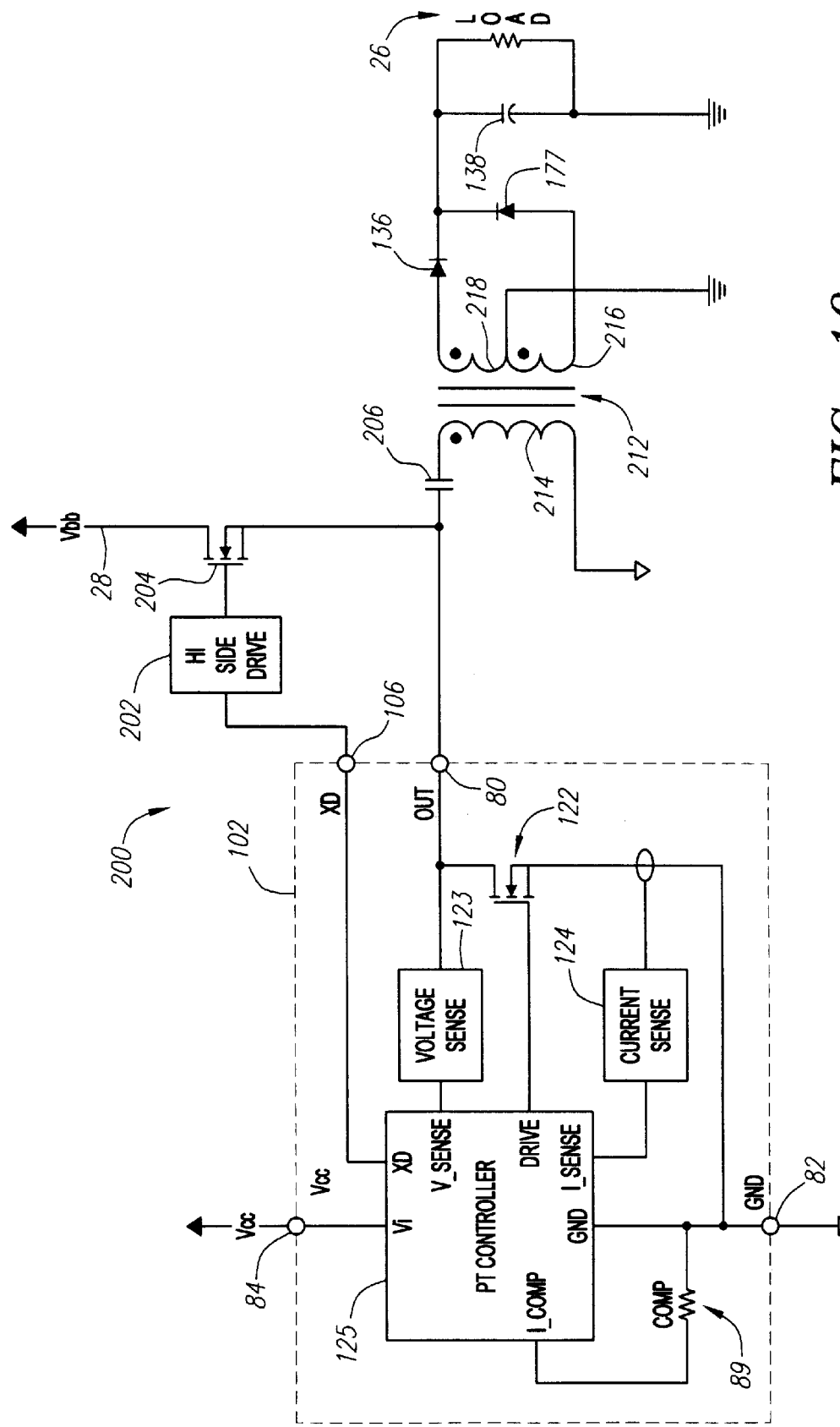
FIG. 10 is a schematic diagram of a half-bridge converter employing the four-terminal controller of FIG. 4.

Referring to FIG. 10, in accordance with a yet another aspect of the invention, a half bridge converter 200 employs the four-terminal (internal compensation) power supply control package 102 to supply current from the DC source $V_{bb}$ 28 across isolating transformer 212 to supply power to load 26. In converter 200, the output terminal 80 of control package 102 is coupled to a first terminal of a resonant capacitor 206. A second terminal of the capacitor 206 is coupled to one end of primary winding 214 of transformer 212, with a second end of the primary winding 214 coupled to a primary side ground reference. The first terminal of capacitor 206 and package terminal 80 are also coupled to the source terminal of an external power switch 204 driven by a conventional hi-side drive 202, with the drain terminal of switch 204 coupled to $V_{bb}$ 28. The pulse train controller 125 delivers equal, but offset in time switching pulses to the internal power switch 122 and external hi-side drive power switch 204, such that, when the hi-side side drive power switch 204 is ON, the internal switch 122 is OFF and vice versa.

Operation of the converter 200 is as follows: When the external hi-side switch 204 is ON (and internal switch 122 OFF), current from the source $V_{bb}$ 28 charges the capacitor 206 and then flows (clockwise) through primary winding 214, where it is transferred through a first secondary winding 218 and diode 136 to the filter/storage capacitor 138 and load 26. When the internal switch 122 is ON (and external hi-side drive switch 204 OFF), the capacitor 206 discharges, causing current flowing in the reverse (i.e., counterclockwise) direction through primary winding 214 to be transferred through a second secondary winding 216 and diode 177 to the filter/storage capacitor 138 and load 26. As will be appreciated by those skilled in the art, transformer 212 is a "real" transformer in that current flows in both directions through the primary winding 214. Thus, no special reset circuitry is needed.

With the half-bridge converter 200 of FIG. 10, the feedback error signal to the pulse train controller 125 is derived differently than for controller 120 in the flyback converters of FIGS. 6 and 8. When the switch 122 is ON, the current sensing circuit 124 senses the peak current I_sense and compares it to the compensation signal I_comp set by resistance 89 and representing the losses across the transformer 212 and secondary diode elements for each ON cycle of switch 122. In addition, instead of sensing a flyback voltage, the voltage sense 123 senses a peak voltage $V_{PEAK}$ at the drain terminal of switch 122 after the switch 204 is turned ON. From the sensed peak voltage $V_{PEAK}$, an estimate of the voltage on the secondary winding $V_S$ is then derived from the relationship $V_S=[(V_{PEAK}/2-1)*N_S/N_{PEAK}-0.5]*(2T_{ON}/T)$, where $N_S/N_{PEAK}$ is the turns ratio for transformer windings 214/(216,218), $T_{ON}$ is the ON time of switch 122, and T is a total switching cycle period for switches 122 and switch 204.

Figure 10A:
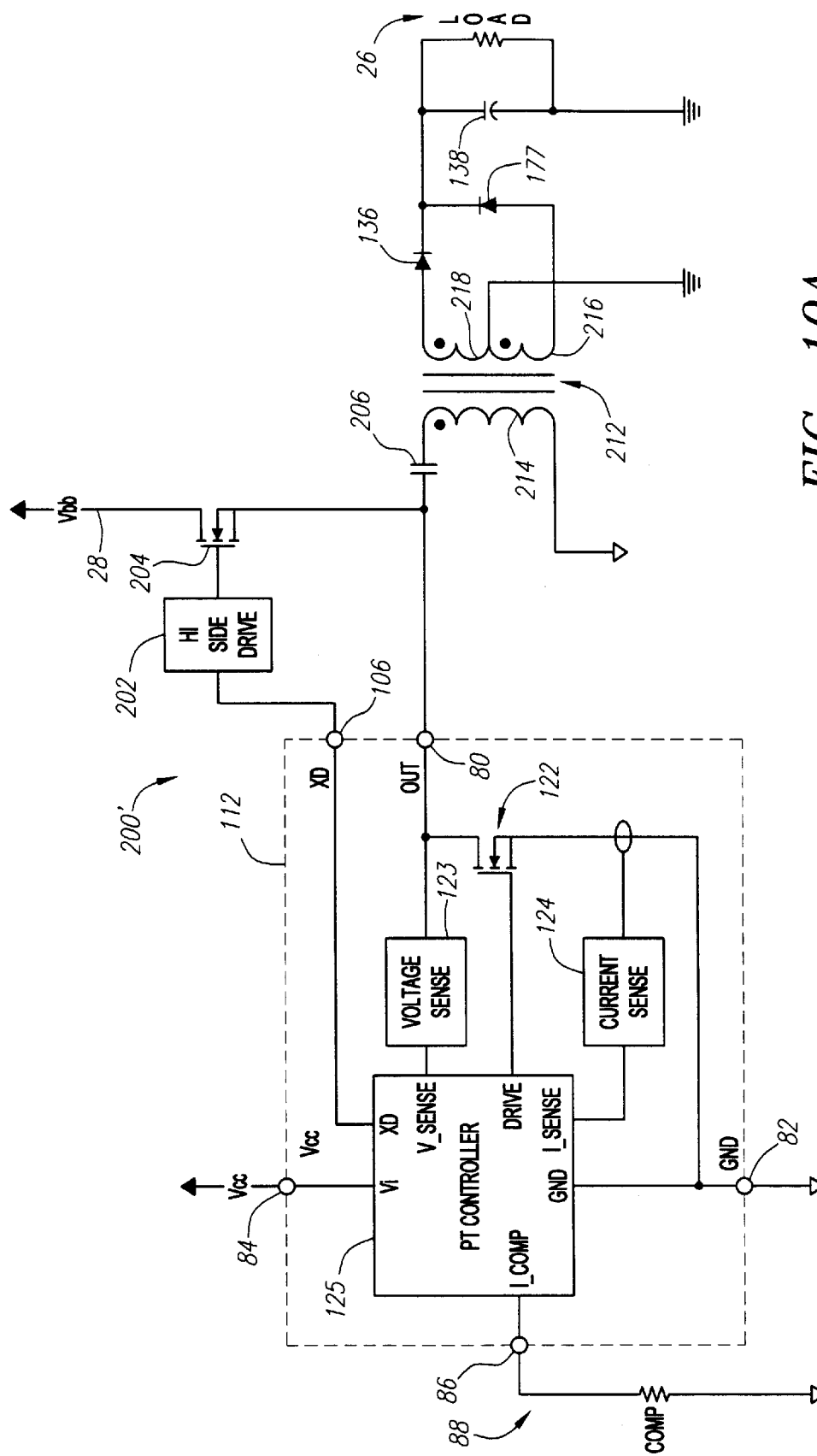
FIG. 10A is a schematic diagram of a half-bridge converter employing the five-terminal controller of FIG. 5.

FIG. 10A shows an alternate embodiment of the converter topology of FIG. 10, (designated as "200'"), wherein the five-terminal (external compensation) control package 112 is used instead of the four-terminal (internal compensation) control package 102.

Figure 11:
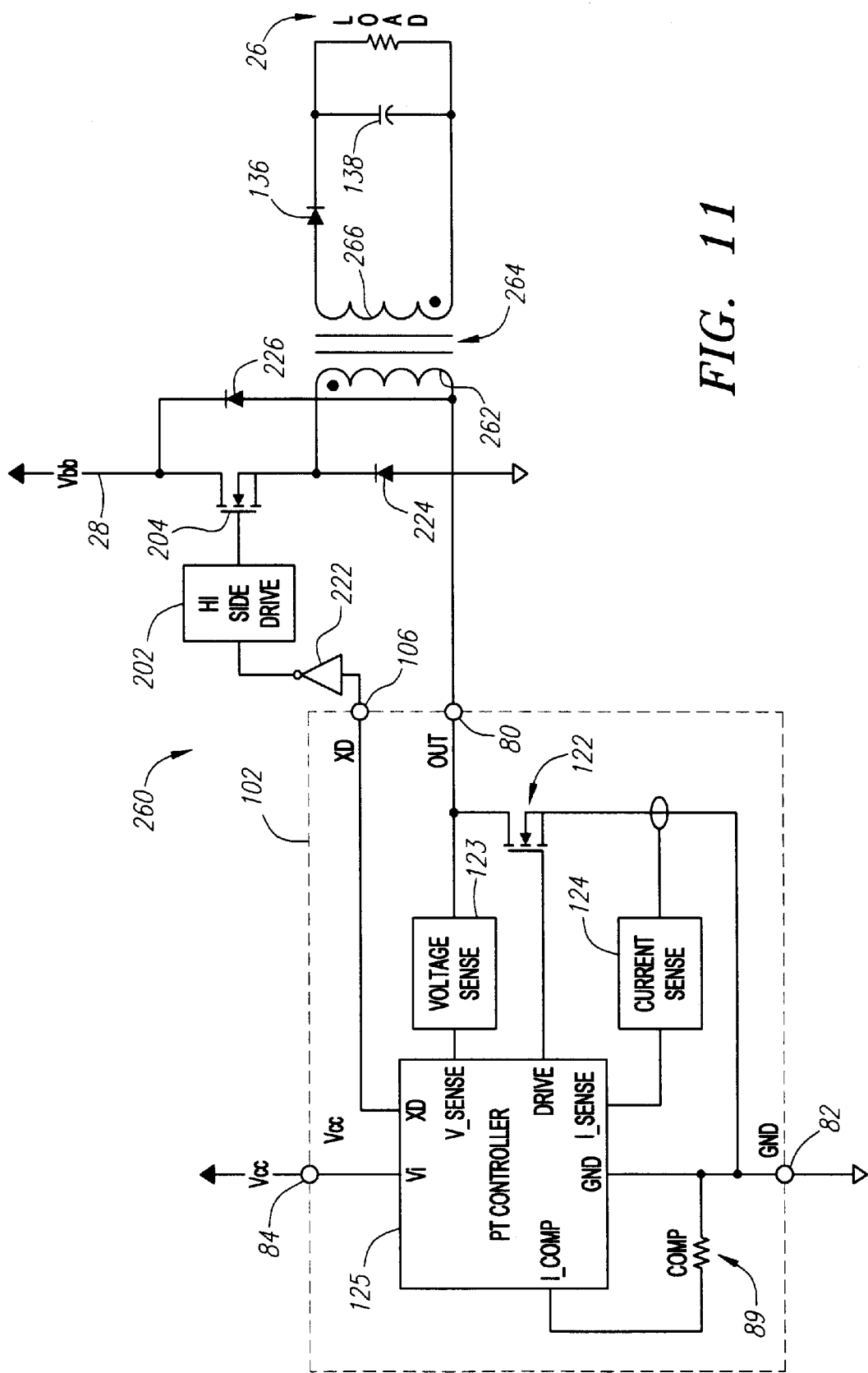
FIG. 11 is a schematic diagram of an interleaved flyback converter employing the four-terminal controller of FIG. 4.

Referring to FIG. 11, in accordance with still another aspect of the invention, an interleaved flyback converter 260 may also employ the four-terminal (internal compensation) control 102 to supply current from the DC source $V_{bb}$ 28 across an isolating transformer 264 to supply power to load 26. Converters 220 and 260 are almost identical, except that the polarity of secondary winding 266 of transformer 264 is flyback-biased, and there is no secondary side storage inductor. In converter 260, when both switches 204 and 122 are ON, current from the source $V_{bb}$ 28 flows (clockwise) through primary winding 262, where it is stored as energy in the core of transformer 264. When switches 122 and 204 are OFF, the stored energy is released as current through the secondary winding 6, which passes through diode 713 to the filter/storage capacitor 138 and load 26. Again, diodes 224 and 226 provide for reset of the transformer 264, while clamping the voltage for protection of power switch 122.

Notably, the internal configuration and operation of pulse train controller 125, as employed in the interleaved-flyback converter 260, including the feedback signals V_flbk, from the voltage sense 123, I_sense for primary current sense 124, and I_comp set by the compensation resistance 89, are the same as the pulse train controller 120 described above in conjunction with FIGS. 6–7.

Figure 11A:
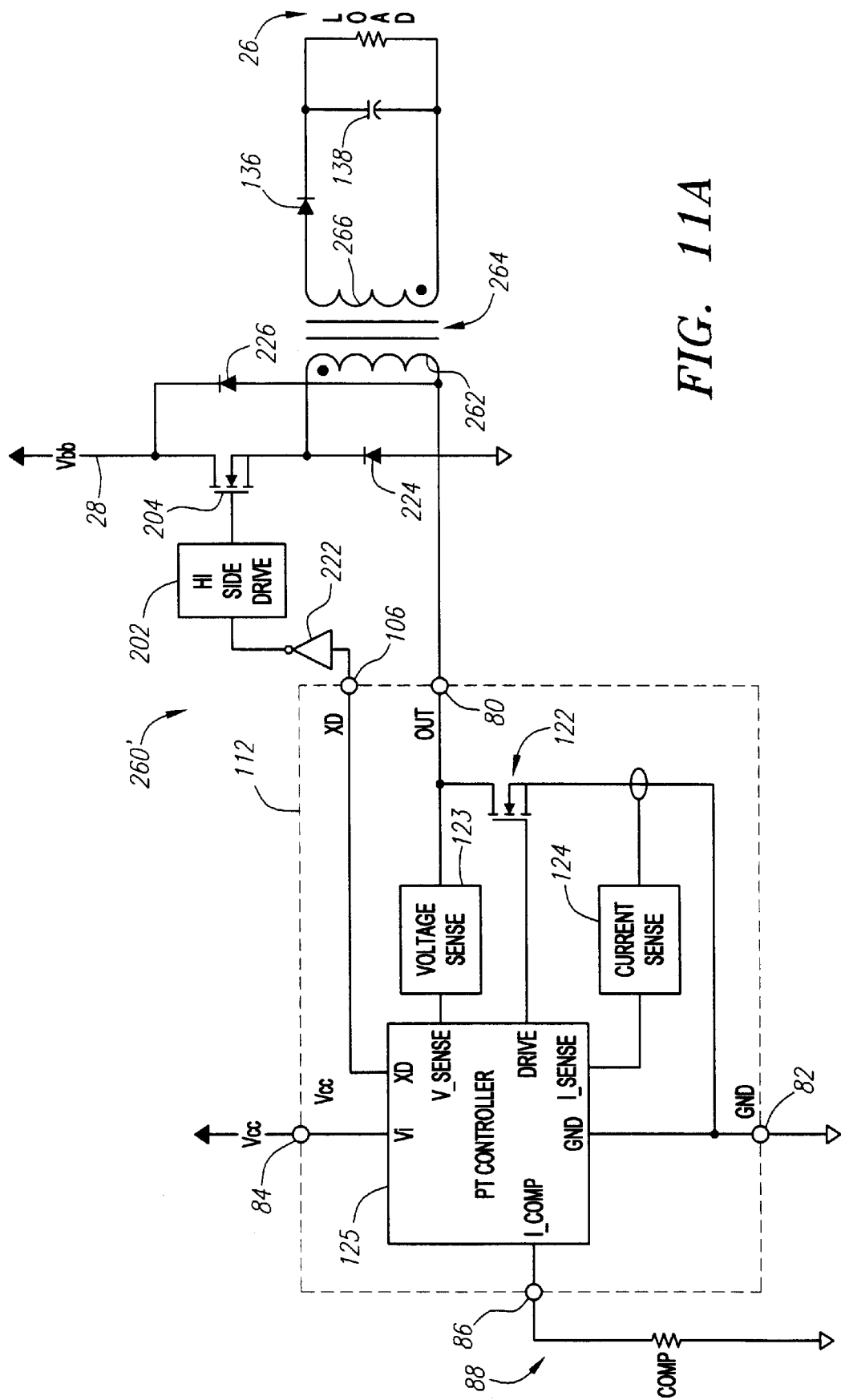
FIG. 11A is a schematic diagram of an interleaved flyback converter employing the five-terminal controller of FIG. 5.

FIG. 11A shows an alternate embodiment of the converter topology of FIG. 11, (designated as "260'"), wherein the five-terminal (external compensation) control package 112 is used instead of the four-terminal (internal compensation) control package 102.

The various elements (i.e., power switch(es) and pulse train control circuitry) of each of the above-described control packages may be provided as a single, monolithic integrated circuit, or alternately may comprise multiple components mounted to a single or multiple substrates. Also, it will be apparent that the operating power $V_{cc}$ supplied through terminal 84 in each of the control packages may be supplied from a supplemental secondary winding of the respective converter transformer, from $V_{bb}$, or from some other source.

Although the invention has been described in terms of the presently preferred embodiments, it will be understood by those skilled in the art that many other embodiments and variations of the invention are possible after having read the disclosure. According, the invention is not to be limited except in accordance with the appended claims and their equivalents.

What is claimed:

1. A power supply package for controlling delivery of power from a source to a load, comprising:

a first terminal for coupling to a primary winding of a transformer;

a second terminal for coupling to a ground reference;

a third terminal for coupling to a source of operating power;

a power switch having an input coupled to the first terminal, an output coupled to the second terminal, and an activation gate; and pulse train control circuitry coupled to the power switch activation gate and responsive to an error signal for driving the power switch, the error signal derived from an internally generated compensation signal corresponding to an expected voltage loss between the source and the load.

2. A flyback converter including the power supply package of claim 1.

3. A power converter including the power supply package of claim 1, the converter further including a transformer having a forward-biased secondary winding and a flyback-biased secondary winding.

4. The power supply package of claim 1, wherein the power switch and pulse train control circuitry are formed as part of a single integrated circuit.

5. A power supply package for controlling delivery of power from a source to a load, comprising:
- a first terminal for coupling to a primary winding of a transformer;
- a second terminal for coupling to a ground reference;
- a third terminal for coupling to a source of operating power;
- a fourth terminal for coupling to an external compensation circuit for generating a compensation signal corresponding to an expected voltage loss between the source and the load;
- a power switch having an input coupled to the first terminal, an output coupled to the second terminal, and an activation gate; and
- pulse train control circuitry coupled to the power switch activation gate and responsive to an error signal for driving the power switch, the error signal derived from the compensation signal received on the fourth terminal.

6. A flyback converter including the power supply package of claim 5.

7. A power converter including the power supply package of claim 5, the converter further including a transformer having a forward-biased secondary winding and a flyback-biased secondary winding.

8. The power supply package of claim 5, wherein the power switch and pulse train control circuitry are formed as part of a single integrated circuit.

9. A power supply package for controlling delivery of power from a source to a load, comprising:
- a first terminal for coupling to a primary winding of a transformer;
- a second terminal for coupling to an activation gate of an external power switch;
- a third terminal for coupling to a ground reference;
- a fourth terminal for coupling to a source of operating power;
- an internal power switch having an input coupled to the first terminal, an output coupled to the third terminal, and an activation gate; and
- pulse train control circuitry coupled to the internal switch activation gate and the second terminal, the pulse train control circuitry responsive to an error signal for driving the respective internal and external power switches, the error signal derived from an internally generated compensation signal corresponding to an expected voltage loss between the source and the load.

10. A push-pull power converter including the power supply package of claim 9.

11. A half-bridge converter including the power supply package of claim 9.

12. An interleaved flyback converter including the power supply package of claim 9.

13. The power supply package of claim 9, wherein the internal power switch and pulse train control circuitry are formed as part of a single integrated circuit.

14. A power supply package for controlling delivery of power from a source to a load, comprising:
- a first terminal for coupling to a primary winding of a transformer;
- a second terminal for coupling to an activation gate of an external power switch;
- a third terminal for coupling to a ground reference;
- a fourth terminal for coupling to a source of operating power;
- a fifth terminal for coupling to a compensation circuit for generating a compensation signal corresponding to an expected voltage loss between the source and the load;
- a power switch having an input coupled to the first terminal, an output coupled to the third terminal, and an activation gate; and
- pulse train control circuitry coupled to the second terminal and the internal switch activation gate, the pulse train control circuitry responsive to an error signal for driving the respective internal and external power switches, the error signal derived from the compensation signal received on the fifth terminal.

15. A push-pull power converter including the power supply package of claim 14.

16. A half-bridge converter including the power supply package of claim 14.

17. An interleaved flyback converter including the power supply package of claim 14.

18. The power supply package of claim 14, wherein the internal power switch and pulse train control circuitry are formed as part of a single integrated circuit.

19. A power supply package for controlling delivery of power from a source to a load, comprising:
- a first terminal for coupling to a first primary winding of a transformer;
- a second terminal for coupling to a second primary winding of the transformer;
- a third terminal for coupling to a ground reference;
- a fourth terminal for coupling to a source of operating power;
- a first power switch having an input coupled to the first terminal, an output coupled to the third terminal, and an activation gate;
- a second power switch having an input coupled to the second terminal, an output coupled to the third terminal, and an activation gate; and
- pulse train control circuitry coupled to the first and second power switch activation gates, the pulse train control circuitry responsive to an error signal for driving the respective first and second power switches, the error signal derived from an internally generated compensation signal corresponding to an expected voltage loss between the source and the load.

20. A push-pull power converter including the power supply package of claim 19.

21. The power supply package of claim 19, wherein the first power switch, second power switch, pulse train control circuitry, or any combination thereof, are formed as part of a single integrated circuit.

22. A power supply package for controlling delivery of power from a source to a load, comprising:
- a first terminal for coupling to a first primary winding of a transformer;

a second terminal for coupling to a second primary winding of the transformer;

a third terminal for coupling to a ground reference;

a fourth terminal for coupling to a source of operating power;

a fifth terminal for coupling to a compensation circuit for generating a compensation signal corresponding to an expected voltage loss between the source and the load;

a first power switch having an input coupled to the first terminal, an output coupled to the third terminal, and an activation gate;

a second power switch having an input coupled to the second terminal, an output coupled to the third terminal, and an activation gate; and pulse train control circuitry coupled to the first and second power switch activation gates, the pulse train control circuitry responsive to an error signal for driving the respective first and second power switches, the error signal derived from the compensation signal received on the fifth terminal.

23. A push-pull power converter including the power supply package of claim 22.

24. The power supply package of claim 22, wherein the first power switch, second power switch, pulse train control circuitry, or any combination thereof, are formed as part of a single integrated circuit.

* * * * *